(No Model.)
G. H. POND.
MANUFACTURE OF WOOD AND OTHER PULP.
No. 351,068. Patented Oct. 19, 1886.
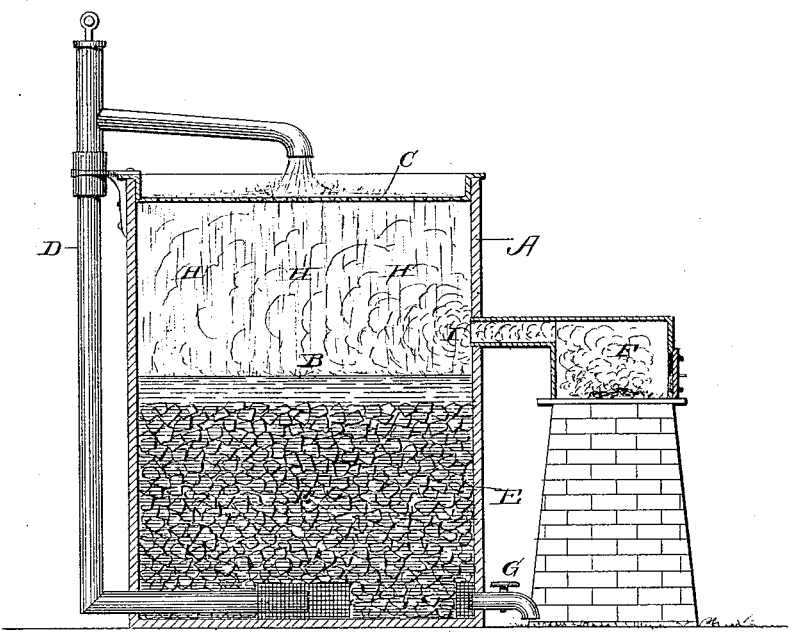
WITNESSES
INVENTOR

UNITED STATES PATENT OFFICE.

GOLDSBURY H. POND, OF RUTLAND, VERMONT.

MANUFACTURE OF WOOD AND OTHER PULP.

SPECIFICATION forming part of Letters Patent No. 351,068, dated October 19, 1886.

Application filed December 12, 1885. Serial No. 185,447. (No model.)

*To all whom it may concern:*

Be it known that I, GOLDSBURY H. POND, a citizen of the United States, residing at Rutland, in the county of Rutland, State of Vermont, have invented certain new and useful Improvements in the Manufacture of Wood and other Pulp, of which the following is a specification, reference being had therein to the accompanying drawing.

My invention relates, mainly, to the manufacture of pulp from wood, but may be used with great advantage upon other material; and the said invention consists in the improvement, hereinafter described and set forth, whereby the manufacture of the pulp is more completely and effectively carried out than heretofore, and with the saving of considerable time.

To these ends my invention consists, also, in the formation of a better chemical solvent to soften the wood and neutralize the natural acids, dissolve the gums and pitch therein, and in the employment of such a chemical solvent, or of any of its constituent parts, in connection with a roller pulp-machine, thereby effecting a saving in the expense, labor, and time in working a charge and allowing for an important reduction in the strength of the solvent, and decreasing the liability of the burning and consequent discoloration of the pulp product.

In the accompanying drawing, forming part of this specification, the figure represents a sectional view of an apparatus designed for carrying out the formation of the improved solvent or solvents.

Heretofore in the manufacture of wood pulp certain chemical solvents have alone been used to effect the decomposition of the material. For instance, in one, caustic alkalies; in another, the acid sulphide of lime, and in another the acid sulphide magnesia. The first processes are objectionable, owing to the expenditure and labor incident, and the last to the expense involved in operating a satisfactory plant.

By my improvement I combine the advantages of all with but one-third of the time, labor, and expense.

To carry out my invention, I take the mineral technically denominated "dolomite," composed of the combination of a carbonate of magnesia and the carbonate of lime, and heat it until it yields both carbonate of lime and carbonate of magnesia to the action of water. Instead, however, of dolomite, any magnesia mineral not containing iron may be employed; and in the absence of either of the above the common lime or limestone may be employed. The dolomite, however, is much the preferable.

After the mineral has been prepared, as described, the apparatus illustrated in the drawing is next used. As represented in said figure, the apparatus consists of a tank, A, provided at its upper portion with a horizontal perforated partition, C, which I term a "distributer."

D designates a pump, the feed-pipe $a$ of which terminates centrally on the bottom of the tank, and is protected by a suitable strainer, $b$. The position of the pump D is such that it discharges into the distributer C. The prepared mineral is placed in the tank A, as indicated by E, and then water introduced in sufficient quantity, but it must not be higher than the line B.

F refers to a furnace located adjacent to the tank, and communicating therewith above the water-line through a flue or conduit, I. A discharge, G, is provided at the bottom of the tank.

Sulphur being placed in the furnace F and the fire and pump started, the sulphurous fumes escape into the space H H, between the distributer and prepared mineral water below. The water, carrying with it the lime and magnesia, or either of them, is pumped up and discharged into the distributer C, by which it is caused to enter the tank in the form of fine descending streams, with which the sulphurous fumes combine, and descends upon the rock, to be again acted upon, and then raised again by the pump, and so on, until it has become thoroughly sulphureted and of the required chemical strength. The liquor is then drawn off by the cock G, and another charge put into the tank, so that the operation is practically a continuous one. After the formation of such liquid a roller pulp-machine of the form set forth in my Patent No. 296,780 is charged with such liquid in quantity sufficient to float the charge of chips, sawdust, shavings, or other material to be made into pulp, and, the necessary heat and pressure being employed, the machine is started and run at the required speed for two or three hours, when the charge will be found to be completely changed into fibrous pulp, the rollers separating the fibers as the wood is softened by the chemical liquor, thereby saving the time and strength of chemical required to dissolve the binding-fibers which hold the wood together.

The benefit of my process will be obvious. The longer the wood is subjected to a chemical solvent the weaker the fibers of the wood become and the more it shrinks. Such disadvantages are overcome by my process, owing to the chemical action of the sulphureted chemicals and the rapid mechanical action of the rollers in the roller pulp-machine.

I claim—

1. The process of reducing wood or other materials to a pulp, consisting in subjecting them to the combined action of the rollers of a roller pulp-machine and sulphureted magnesia in a charge under heat and pressure, in the manner set forth.

2. A solvent for wood or other materials in the manufacture of pulp, consisting of sulphureted lime and magnesia chemically combined, and applied in a charge under heat and pressure, substantially as set forth.

3. The process of reducing wood and other materials to a pulp, which consists in subjecting it in whole or in part to the action of a solvent of sulphureted magnesia and lime, substantially as set forth.

4. The process of making pulp from wood and other materials, consisting in subjecting them to the combined action of the rollers of a roller pulp-machine and sulphureted lime in a charge under heat and pressure, substantially as set forth.

5. The combination, in an apparatus for the manufacture of wood and other pulp, of the tank A, the pump D, and the distributer C, with the furnace F, for sulphureting lime, magnesia, and other chemicals and minerals in solution.

In testimony whereof I affix my signature in presence of two witnesses.

GOLDSBURY H. POND.

Witnesses:
N. H. ACKER,
WILLIAM PAXTON.